March 29, 1966        T. HUSTON        3,243,068

FOOD CONTAINER

Filed Sept. 14, 1964

INVENTOR.
TOM HUSTON
BY Edward C. Threedy
HIS ATTORNEYS.

United States Patent Office 3,243,068
Patented Mar. 29, 1966

3,243,068
FOOD CONTAINER
Tom Huston, 8275 SW. 64th St., Miami, Fla.
Filed Sept. 14, 1964, Ser. No. 395,991
4 Claims. (Cl. 215—10)

This invention relates to a food container.

A principal object of the invention is to provide a food container in the form of a transparent jar for displaying a food product contained therein, and for use as a server of such product.

A further object of the invention is to incorporate in such container an inner cover member stored in a compartment between removable pliable disposable plates, whereby when said plates are removed and disposed of, the inner cover member may be utilized as a protective cover for the container when used as a server or when stored in a refrigerator or other storage place.

A still further object of the invention is the provision of a construction of container whereby a plurality of the containers may be stacked in a substantially vertical plane when in a refrigerator or on a cabinet shelf or the like.

Other objects will appear hereinafter.

The invention consists of the novel combination and arrangement of parts to be hereinafter described and claimed.

The invention will be best understood by reference to the accompanying drawings showing the preferred form of construction, and in which.

Figure 1:
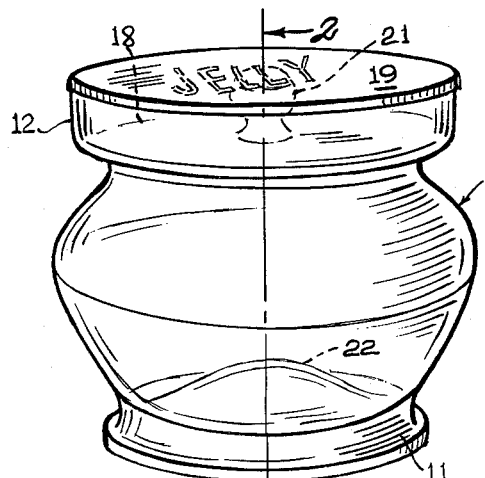
FIG. 1 is a perspective view of the container embodying my invention.
Figure 2:
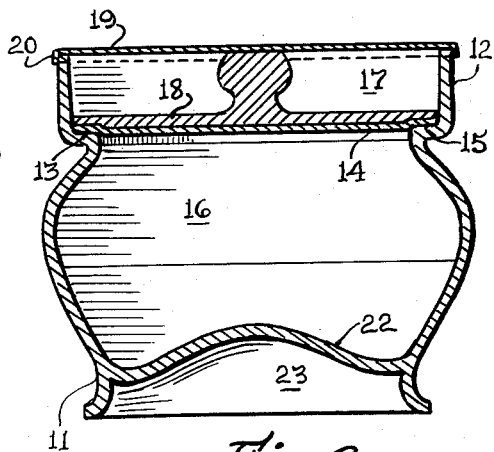
FIG. 2 is a vertical sectional detail view of the same.
Figure 3:
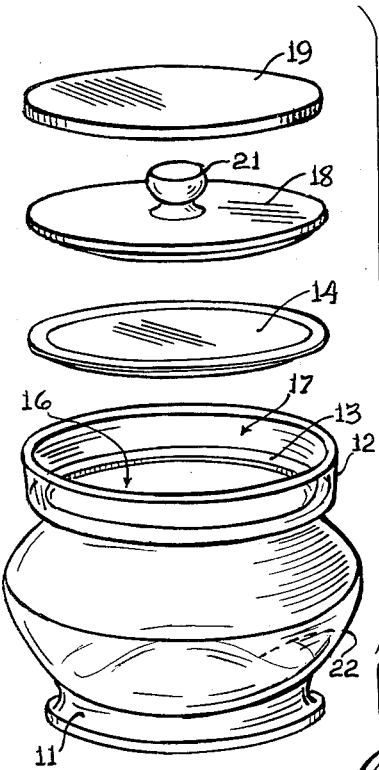
Figure 4:
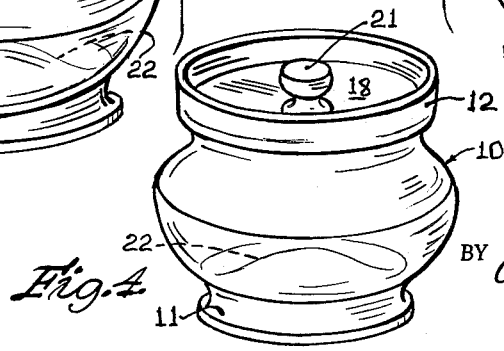
Figure 5:
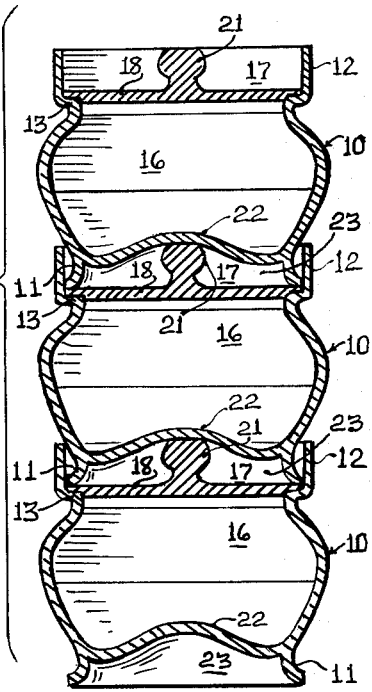

FG. 3 is a perspective view of the several parts of the container shown in exploded relation with respect to each other;

FIG. 4 is a perspective view of the container embodied in my invention similar to that shown in FIGS. 1 and 2 but with the outer cover plate removed; and FIG. 5 is a vertical sectional detail view showing a plurality of containers embodying the invention arranged in vertical stacked relation with respect to each other.

The several objects of my invention are preferably accomplished by the preferred form of construction shown in the accompanying drawing. In such drawings the container is generally indicated at 10. The container 10 is preferably formed of ornamental configuration to add aesthetic appeal. The container, as shown in the drawings, is in the form of a jar having a bottom portion 11 and a neck portion 12.

The bottom portion 11 provides a base for the jar. The outer diameter of the base 11 is less than the diameter of the neck 12 for reasons hereinafter set forth.

At the junction between the intermediate portion of the jar and the neck portion there is provided an internal shoulder 13. Seated on this shoulder 13 is a pliable, disposable plate 14, the peripheral edges of which are sealed to the shoulder as at 15.

This plate 14 divides the jar into a lower compartment 16 and an upper compartment 17. The jar is made of translucent material so that food contained in the lower compartment 16 may be clearly visible and be observed by a potential purchaser.

In the compartment 17, there is placed upon the plate 14 a protective cover 18, the diameter of the cover being slightly less than the inner diameter of the neck to permit the cover to be conveniently placed within the neck. A pliable disposable outer cover plate 19 closes the open end of the neck 12 and has its peripheral edge portions 20 removably sealed thereto.

The cover 18 has an integral finger knob 21 which facilitates manipulation of the cover 18. The bottom wall 22 of the compartment 16 is of convex formation to provide a space 23 for the finger knob 21 when a plurality of the jars are stacked in substantially a vertical plane. The cover 18 may be formed of the same material as the jar 10.

In the present form of the container 10, it is shaped ornamentally to present an article suitable for placing upon a table for serving purposes. When displayed in a store, the protective cover 18 is confined within the compartment 17, and plates 14 and 19 are effectively sealed to preserve the food product contained in the compartment 16.

In use, by means of a suitable tool, such as the common jar cover or cap puller, the plate 19 is removed to permit removal of the protective cover 18. After removal of the protective cover 18 by means of the handle 21, the plate 14 is removed by means of a suitable tool, such as an ice pick, fork tine, or the like. Upon removal of these two plates 14 and 19, the protective cover 18 is replaced in the compartment and supported therein by the shoulder 13 thereby to protect the food contained within the compartment 16, and to facilitate convenient serving of such food content.

As shown in FIG. 5, a plurality of like jars may be arranged in stacked formation.

From the foregoing description, it will be obvious that I provide a container which will with maximum efficiency preserve and exhibit the food contained therein when the container is mounted upon a shelf or other place to be exhibited to potential purchasers. Also, after the container has been purchased, by the removal of the plates 14 and 19 the container may be used as a server of the food contents thus eliminating the necessity of the housewife transferring the contents to another dish for use upon the table. The shape of the container will add to the attractiveness of the same and be an element of inducement to purchase the container. After the meal, with the protective cover 18 in place, the partially filled container may be placed in the refrigerator until needed. Filled or empty, a plurality of containers may be conveniently stacked for space-saving as shown in FIG. 5.

Having thus described my invention, what I claim as new and desire to protect by Letters Patent is:

1. A food container comprising
   (a) a body having a convexed side wall defining a food storage compartment,
   (b) said side wall providing a horizontally disposed annular shoulder defining a restricted opening for said food storage compartment,
   (c) said shoulder having its outer extremities formed to provide a vertically extending circular flange forming an enlarged neck for said container,
   (d) said side wall wall of said body terminating into a concaved bottom wall,
   (e) a base flange extending downwardly and outwardly from said bottom wall of said body and having its peripheral edge equal in diameter to the inner diameter of said neck so as to sit therein when a plurality of the containers are vertically stacked, and
   (f) a cover for said food storage compartment within said neck and seated upon said shoulder and having a vertically extending handle of a height equal to the width of said circular flange so as to be disposed beneath the concaved bottom wall and within the base flange of a juxtaposed stacked container.

2. A food container comprising
   (a) a body having a convexed side wall defining a food storage compartment,
   (b) said side wall providing a horizontally disposed annular shoulder defining a restricted opening for said food storage compartment, (c) said shoulder having its outer extremities formed to provide a vertically extending circular flange forming an enlarged neck for said container,
(d) a reusable cover seated on said annular shoulder for closing said restricted opening of said food storage compartment,
(e) said side wall of said body terminating into a concaved bottom wall,
(f) a base flange extending downwardly and outwardly from said bottom wall of said body and having its peripheral edge equal in diameter to the inner diameter of said neck so as to sit therein when a plurality of the containers are vertically stacked.

3. A food container comprising
(a) a body having a convexed side wall defining a food storage compartment,
(b) said side wall providing a horizontally disposed annular shoulder defining a restricted opening for said food storage compartment,
(c) said shoulder having its outer extremities formed to provide a vertically extending circular flange forming an enlarged neck for said container,
(d) a reusable cover seated on said annular shoulder for closing said restricted opening of said food storage compartment,
(e) said side wall of said body terminating into a concaved bottom wall,
(f) a base flange extending downwardly and outwardly from said bottom wall of said body and having its peripheral edge equal in diameter to the inner diameter of said neck so as to sit therein when a plurality of the containers are vertically stacked with the peripheral edge of said base flange bearing upon the inner wall surface of said neck to prevent horizontal displacement of the stacked containers.

4. A food container comprising
(a) a body having a convexed side wall defining a food storage compartment,
(b) said side wall providing a horizontally disposed annular shoulder defining a restricted opening for said food storage compartment,
(c) said shoulder having its outer extremities formed to provide a vertically extending circular flange forming an enlarged neck for said container,
(d) a reusable cover seated on said annular shoulder for closing said restricted opening of said food storage compartment,
(e) said side wall of said body terminating into a concaved bottom wall,
(f) a base flange extending downwardly and outwardly from said bottom wall of said body and having its peripheral edge equal in diameter to the inner diameter of said neck so as to sit therein when a plurality of the containers are vertically stacked with the peripheral edge of said base flange bearing upon the inner wall surface of said neck to prevent horizontal displacement of the stacked containers,
(g) said cover having a vertically extending handle of a height equal to the width of said circular flange so as to be disposed beneath the concaved bottom wall and within the base flange of a juxtaposed stacked container.

References Cited by the Examiner

UNITED STATES PATENTS

| | | | |
|---|---|---|---|
| 111,680 | 2/1871 | Putnam | 215—6 |
| 1,745,935 | 2/1930 | Kirmser | 220—97 |
| 2,298,814 | 10/1942 | Weis. | |
| 2,358,270 | 9/1944 | Wild | 220—29 X |
| 2,396,346 | 3/1946 | Roody | 215—10 X |

FOREIGN PATENTS

| | | |
|---|---|---|
| 7,241 | 1888 | Great Britain. |
| 11,667 | 1902 | Great Britain. |

JOSEPH R. LECLAIR, *Primary Examiner.*

D. F. NORTON, *Assistant Examiner.*